(12) United States Patent
Zhang et al.

(10) Patent No.: US 11,296,425 B2
(45) Date of Patent: Apr. 5, 2022

(54) DUAL-POLARIZED DUPLEX ANTENNA AND DUAL-BAND BASE STATION ANTENNA ARRAY COMPOSED THEREOF

(71) Applicant: South China University of Technology, Guangzhou (CN)

(72) Inventors: Xiuyin Zhang, Guangzhou (CN); Yufeng Wu, Guangzhou (CN); Yunfei Cao, Guangzhou (CN); Wen Duan, Guangzhou (CN); Yao Zhang, Guangzhou (CN)

(73) Assignee: South China University of Technology

( * ) Notice: Subject to any disclaimer, the term of this patent is extended or adjusted under 35 U.S.C. 154(b) by 334 days.

(21) Appl. No.: 16/491,400

(22) PCT Filed: Oct. 18, 2018

(86) PCT No.: PCT/CN2018/110819
§ 371 (c)(1),
(2) Date: Sep. 5, 2019

(87) PCT Pub. No.: WO2019/223222
PCT Pub. Date: Nov. 28, 2019

(65) Prior Publication Data
US 2021/0336351 A1   Oct. 28, 2021

(30) Foreign Application Priority Data

May 22, 2018  (CN) .......................... 201810493019.2

(51) Int. Cl.
*H01Q 21/06* (2006.01)
*H01Q 15/00* (2006.01)
(Continued)

(52) U.S. Cl.
CPC ....... *H01Q 21/061* (2013.01); *H01Q 15/0013* (2013.01); *H01Q 15/24* (2013.01);
(Continued)

(58) Field of Classification Search
CPC .. H01Q 21/061; H01Q 15/24; H01Q 15/0013; H01Q 19/104; H01Q 21/0006;
(Continued)

(56) References Cited

U.S. PATENT DOCUMENTS

2013/0169501 A1   7/2013   Kummetz et al.
2015/0244080 A1   8/2015   Gregoire et al.
(Continued)

FOREIGN PATENT DOCUMENTS

CN   107134639 A   9/2017
CN   107394387 A   11/2017
(Continued)

OTHER PUBLICATIONS

Lee et al., "A Filtering Diplexing Antenna for Dual-Band Operation With Similar Radiation Patterns and Low Cross-Polarization Levels", IEEE Antennas and Wireless Propagation Letters, 2017, vol. 16, pp. 58-61.

*Primary Examiner* — Andrea Lindgren Baltzell
*Assistant Examiner* — Yonchan J Kim
(74) *Attorney, Agent, or Firm* — The Webb Law Firm

(57) ABSTRACT

A dual-polarized duplex antenna includes a top-layer dielectric substrate; a metal reflective ground plate below the top-layer dielectric substrate; vertically-placed duplex baluns for duplexing operation between the top-layer dielectric substrate and the metal reflective ground plate; and four dipole arms horizontally printed on an upper surface of the top-layer dielectric substrate. Each of the duplex balun includes a vertical dielectric substrate, a balun feedline printed on a front side of the vertical dielectric substrate, and a ground plane with a printed slot line printed on a reverse side of the vertical dielectric substrate. The balun feedline includes a low-pass filter, a high-pass filter and a microstrip feeding structure serving as a connection. The low-pass filter (Continued)

and the high-pass filter are located on two sides of the slot line, and are connected together by the microstrip feeding structure.

8 Claims, 7 Drawing Sheets

(51) Int. Cl.
    *H01Q 15/24*     (2006.01)
    *H01Q 19/10*     (2006.01)
    *H01Q 21/00*     (2006.01)
    *H01Q 21/26*     (2006.01)
    *H01Q 1/24*     (2006.01)

(52) U.S. Cl.
    CPC ....... *H01Q 19/104* (2013.01); *H01Q 21/0006* (2013.01); *H01Q 21/26* (2013.01); *H01Q 1/246* (2013.01)

(58) Field of Classification Search
    CPC ............ H01Q 9/16; H01Q 9/28; H01Q 21/26; H01Q 1/246; H01P 5/10; H03H 7/42
    See application file for complete search history.

(56) References Cited

U.S. PATENT DOCUMENTS

2018/0191083 A1*   7/2018   Daojian ................... H01Q 5/30
2019/0081407 A1*   3/2019   Doudou ................. H01Q 1/246

FOREIGN PATENT DOCUMENTS

| CN | 108493602 A | 9/2018 |
| CN | 208299028 U | 12/2018 |

* cited by examiner

DUAL-POLARIZED DUPLEX ANTENNA AND DUAL-BAND BASE STATION ANTENNA ARRAY COMPOSED THEREOF

CROSS-REFERENCE TO RELATED APPLICATIONS

This application is the United States national phase of International Application No. PCT/CN2018/110819 filed Oct. 18, 2018, and claims priority to Chinese Patent Application No. 201810493019.2 filed May 22, 2018, the disclosures of which are hereby incorporated by reference in their entirety.

TECHNICAL FIELD

The present disclosure relates to the field of wireless mobile communications, and in particular, to a dual-polarized duplex antenna and a dual-band base-station antenna array composed thereof.

BACKGROUND

Transceiving duplexing is a common method in mobile communications. In a communication system, for the implementation of transceiving duplexing, a problem to solve is mutual interference between transceiving channels. In frequency division duplexing, different transceiving channels occupy different frequencies, and a mode of directly cascading a duplexer with an antenna is often adopted to increase the isolation between the transceiving channels, thereby reducing interference. However, this mode of directly cascading a duplexer with an antenna uses a 50-Ω connecting line and a corresponding matching network, which increases the size, loss, and cost of the system.

In order to achieve higher integration of the antenna with the duplexer and achieve the goal of reducing the size of the system and reducing the cascading loss, the concept of a duplex antenna has been proposed. In order to miniaturize the size of the system, it has been documented that duplex (dual-band) operation is achieved by removing the 50-Ω connecting line and the corresponding matching network. However, input and output ports of the antenna still exist in a duplexer circuit, so the insertion loss introduced by the duplexer cannot be solved. A duplex antenna without any filter or resonator structure was proposed by Y.-J. Lee, J.-H. Tarng, S.-J. Chung in "A filtering duplexing antenna for dual-band operation with similar radiation patterns and low cross-polarization levels", IEEE Antennas and Wireless Propag. Lett. vol. 16, pp. 58-61 in 2017. In this design, the size of the system is reduced and higher isolation between transceiving channels is also achieved. However, the gain of the antenna is relatively low. Moreover, these duplex antennas are single-polarized, and it is also difficult to expand the designed structure into a dual-polarized radiation mode.

At present, there are two main ways to achieve dual polarization and transceiving duplexing. One way is to use two dual-polarized antennas at different frequencies which are connected with corresponding filters and matching networks; and the other is to use a broadband dual-polarized antenna connected with two duplexers. However, both ways increase the size and loss of the system.

SUMMARY OF THE INVENTION

In order to overcome the shortcomings and deficiencies of the prior art, the present disclosure provides a dual-polarized duplex antenna and a dual-band base station antenna array composed thereof. For example, a design in which the functions of the duplexer are integrated into a dual-polarized antenna may be provided.

The antenna realizes functions of dual polarization and duplex communication without any additional size, and has higher gain, less insertion loss, better polarization isolation and cross-band isolation, thereby meeting the basic requirements of communication system.

The present disclosure adopts the following technical solutions:

A dual-polarized duplex antenna comprises a top-layer dielectric substrate, below which a metal reflective ground plate is placed, and vertically-placed duplex baluns for duplexing operation are placed between the top-layer dielectric substrate and the metal reflective ground plate. The duplex balun comprises a vertical dielectric substrate, a balun feeding line is printed on the front side of the vertical dielectric substrate, and a ground plane having a slot line formed thereon is printed on the reverse side of the vertical dielectric substrate;

the balun feeding line comprises a low-pass filter, a high-pass filter and a microstrip feeding structure serving as a connection, wherein the low-pass filter and the high-pass filter are located on the two sides of the slot line respectively, and are connected via the microstrip feeding structure; and four dipole arms are horizontally placed on an upper surface of the top-layer dielectric substrate, where two dipole arms are placed at +45°, the other two dipole arms are placed at −45°, and the dipole arms are in symmetry with respect to the center of the top-layer dielectric substrate.

There are two said duplex baluns, the two duplex baluns have the same structure, are in orthogonal nesting arrangement and are placed in directions of +45° and −45° respectively. The upper side of the ground plane of the duplex balun placed in the direction of +45° is connected with the two dipole arms at +45°, and the bottom thereof is connected with the metal reflective ground plate; the ground plane of the duplex balun at −45° is connected with the two dipole arms at −45°, and the bottom thereof is connected with the metal reflective ground plate.

The low-pass filter is formed by connecting at least one open-circuited stub with a low-pass main microstrip line in parallel;

the high-pass filter is formed by connecting at least one short-circuited stub with a high-pass main microstrip line in parallel; and the microstrip feeding structure serving as a connection is composed of a microstrip line and U-shaped microstrip lines which are connected by coupling at both ends thereof.

There are four said open-circuited stubs, which are located at an upper end, a left side and a right side of the low-pass main microstrip line; and there are four said short-circuited stubs, which are connected in parallel at an upper end, a left side and a right side of the high-pass main microstrip line.

The high-pass main microstrip line and the low-pass main microstrip line are formed by connecting a plurality of microstrip lines with different widths in series.

The dual-polarized duplex antenna according to the present disclosure further comprises four input ports, wherein two of the input ports are low-pass input ports, the other two are high-pass input ports, the low-pass input ports are connected with the low-pass filter, and the high-pass input ports are connected with the high-pass filter.

The metal reflective ground plate and the top-layer dielectric substrate are horizontally arranged.

A dual-band base station antenna array is composed of N×M dual-polarized duplex antennas. As an example, the dual-polarized duplex antennas may be arranged in a matrix N×M of the dual-polarized duplex antennas.

Beneficial effects of non-limiting embodiments or aspects of the present disclosure are as follows:

(1) A filtering structure and baluns are designed in an integrated mode, in which no extra size is added, the antenna itself integrates duplex (dual-band operation) and filtering characteristics, and the problems of insertion loss and extra size caused by a conventional cascade type antenna are solved;

(2) The antenna has high gain in antenna passband, good directional radiation performance, stable radiation pattern, remarkable out-of-band suppression, and good frequency selectivity characteristic;

(3) The proposed design method of integrating the duplex performance into symmetrical dipoles can perfectly achieve dual-polarized radiation and meet requirements for the polarization isolation and cross-band isolation in mobile communication;

(4) A PCB structure is adopted, which is easy to be manufactured and installed; and/or the like.

DESCRIPTION OF THE INVENTION

Hereafter non-limiting embodiments or aspects of the present disclosure will be further illustrated in detail in conjunction with the appended drawings, but the embodiments of the present disclosure are not limited thereto.

Figure 1:
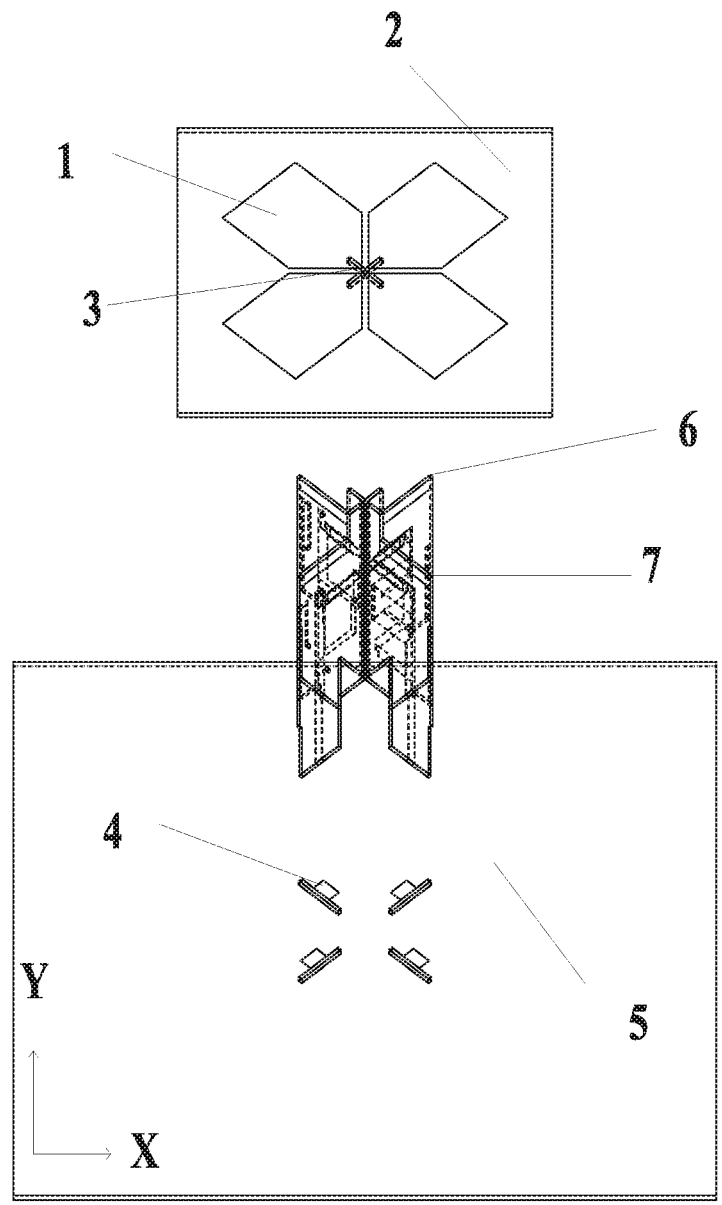
FIG. 1 is a schematic structural view of non-limiting embodiments or aspects of the present disclosure.
Figure 2A:
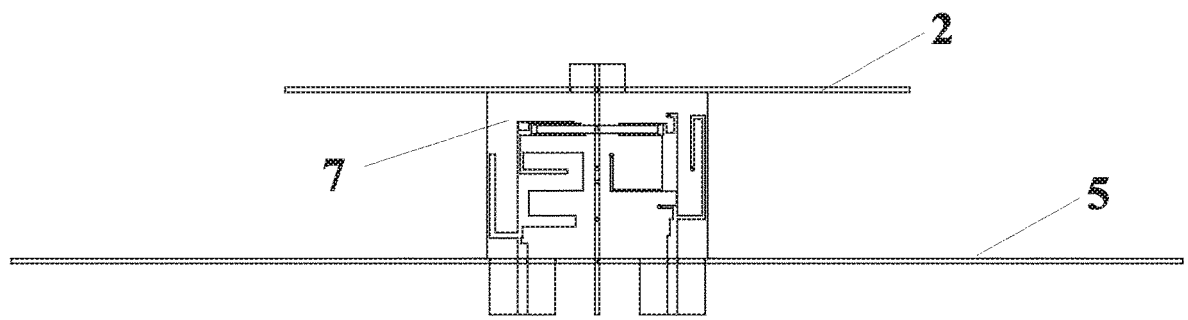
FIG. 2(a) is a side view of FIG. 1.
Figure 2B:
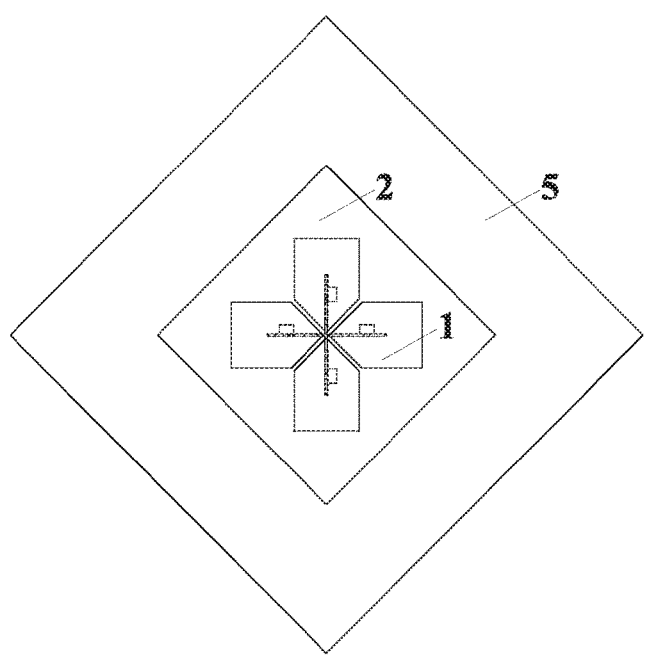
FIG. 2(b) is a top view of FIG. 1.
Figure 3A:
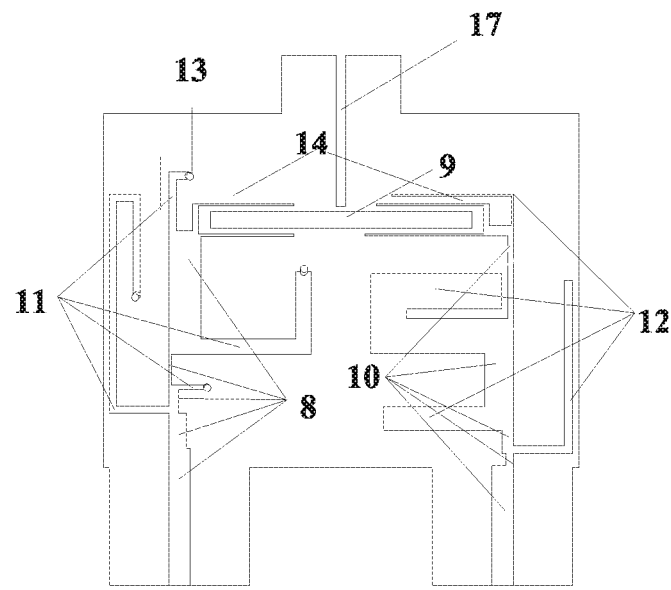
FIG. 3(a) is a front side of +45° polarization of the balun in FIG. 1.
Figure 3B:
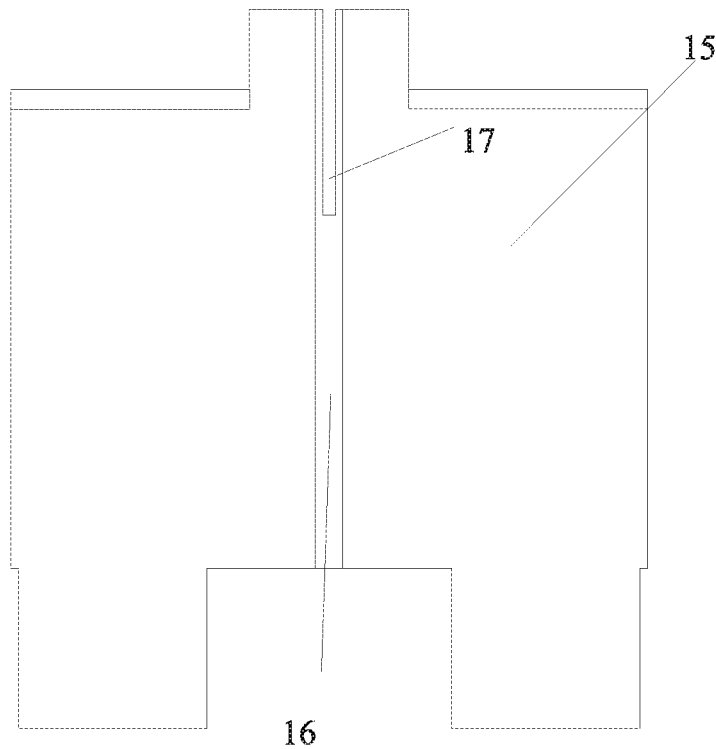
FIG. 3(b) is a reverse side of +45° polarization of the balun in FIG. 1.
Figure 3C:
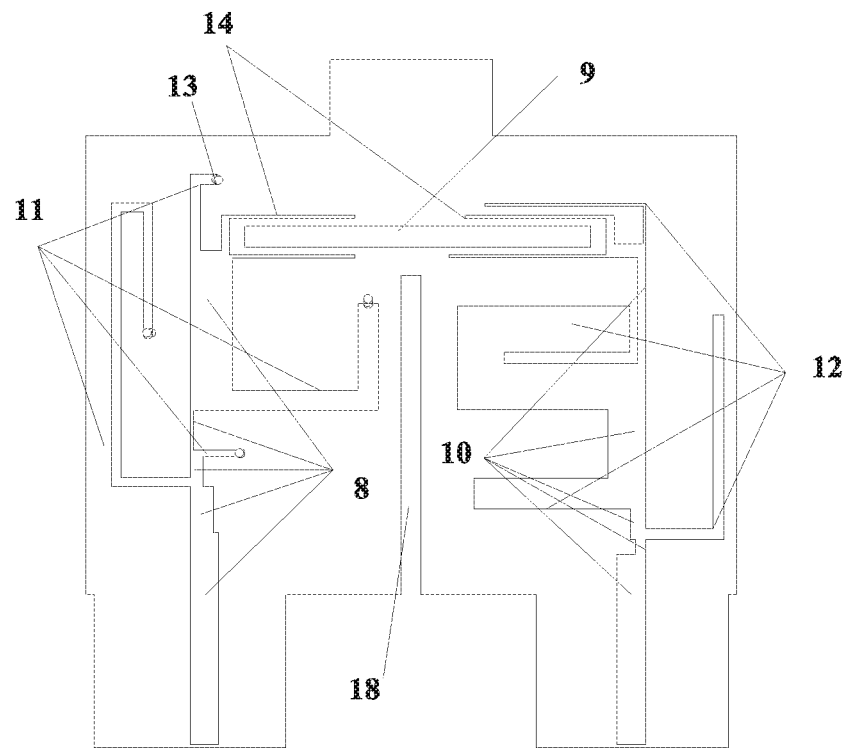
FIG. 3(c) is a front side of −45° polarization of the balun in FIG. 1.
Figure 3D:
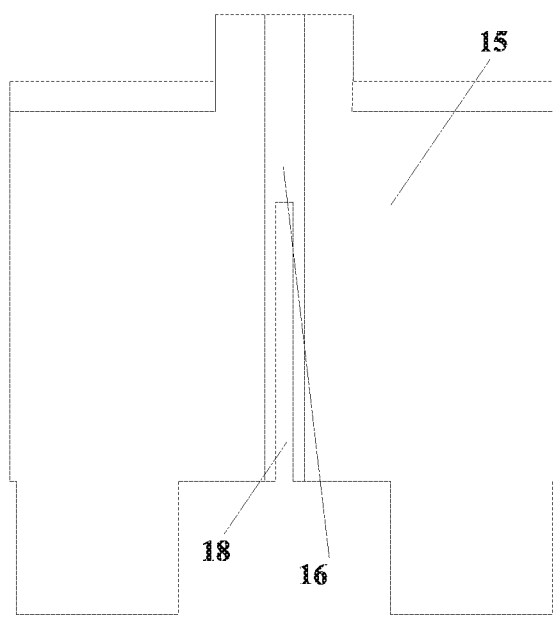
FIG. 3(d) is a reverse side of −45° polarization of the balun in FIG. 1.

As shown in FIG. 1, FIG. 2(a), FIG. 2(b), FIG. 3(a), FIG. 3(b), FIG. 3(c) and FIG. 3(d), a dual-polarized duplex antenna comprises a top-layer dielectric substrate 2, wherein a metal reflective ground plate 5 is horizontally placed below the top-layer dielectric substrate 2, and four dipole arms 1 are horizontally placed on the upper surface of the top-layer dielectric substrate, with two of the dipole arms at +45° (e.g., relative to a center or origin of a two-dimensional axis of the upper surface of the top-layer dielectric substrate, etc.) to form +45° polarized radiation; the other two dipole arms at −45° (e.g., relative to a center or origin of a two-dimensional axis of the upper surface of the top-layer dielectric subtrate, etc.) to form −45° polarized radiation, and the four dipole arms being in central symmetry with respect to the top-layer dielectric substrate (e.g., about the center or origin thereof, etc.); and a coordinate axis is as shown in FIG. 1.

Vertically-placed duplex baluns 6 and 7 which achieve duplex operation and ensure good isolation of two frequency bands are placed between the top-layer dielectric substrate and the metal reflective ground plate. There may be two duplex baluns, and the two duplex baluns may have the same structure and may be placed at +45° and −45° respectively. A duplex balun may include a vertical dielectric substrate, a balun feeding line is printed on the front side of the vertical dielectric substrate and a ground plane 15 having a slot line 16 formed thereon is printed on the reverse side of the vertical dielectric substrate (e.g., opposite to the front side of the vertical dielectric substrate, etc.). The vertical slot line is etched along a longitudinal center line of the ground plane.

An upper side of the ground plane of the duplex balun placed in the direction of +45° is connected with the two dipole arms placed at +45°, and a bottom thereof is connected with the metal reflective ground plate; the ground plane of the duplex balun operating at −45° is connected with the two dipole arms placed at −45°, and a bottom thereof is connected with the metal reflective ground plate. The symmetrical dipoles have a wide operating frequency band, and can cover two operating passbands of the low-pass filter and the high-pass filter in the duplex balun feeding line.

The center of the top-layer dielectric substrate is provided with a cross slot 3 for mounting and securing the vertically-placed duplex balun.

The balun feeding line comprises a low-pass filter, a high-pass filter and a microstrip feeding structure serving as a connection;

where the low-pass filter and the high-pass filter are located on the two sides of the vertical slot line respectively (e.g., on opposite sides of the vertical slot line, etc.), and are connected together via the microstrip feeding structure;

the high-pass filter is formed by connecting at least one short-circuited stub 11 to a high-pass main microstrip line 8 in parallel. In some non-limiting embodiments or aspects, there are four short-circuited stubs, one of which is connected to an upper end of the high-pass main microstrip line, another is connected to a left side of the high-pass main microstrip line, and the remainder two short-circuited stubs are connected to the right side of the high-pass main microstrip line. The high-pass main microstrip line is formed by connecting a plurality of microstrip lines with different widths in series. In some non-limiting embodiments or aspects, there are 5 microstrip lines, where the lowest microstrip line has a characteristic impedance of 50Ω, and a metal probe 13 is placed at the tail end of the short-circuited stub.

The low-pass filter is formed by connecting at least one open-circuited stub 12 to a low-pass main microstrip line 10 in parallel. In some non-limiting embodiments or aspects, there are four open-circuited stubs, one of which is connected to an upper end of the low-pass main microstrip line, another is connected to a right side of the high-pass main microstrip line, and the remainder two open-circuited stubs are connected to a left side of the high-pass main microstrip line. The low-pass main microstrip line is formed by connecting a plurality of microstrip lines with different widths in series. In some non-limiting embodiments or aspects, there are 5 microstrip lines, where the lowest microstrip line has a characteristic impedance of 50Ω.

An upper side of a ground plane of the duplex balun placed in the direction of +45° is connected with the two dipole arms placed at +45°, and a bottom (e.g., opposite to the upper side, etc.) of the ground plane of the duplex balun at +45° is connected with the metal reflective ground plate; a ground plane of the duplex balun operating at −45° is connected with the two dipole arms placed at −45°, and a bottom (e.g., opposite to the upper side, etc.) of the ground plane of the duplex balun at −45° is connected with the metal reflective ground plate. The metal reflective ground plate is provided with a via or opening 4 for a coaxial line to pass through.

The dielectric substrates of the vertically-placed duplex baluns are provided with clamping grooves 17 and 18 for mounting and securing two orthogonally-placed duplex baluns.

The microstrip feeding structure serving as the connection is composed of a microstrip line 9 and U-shaped microstrip lines 14 which are connected by coupling at both ends thereof.

A duplex antenna element may have four input ports in total, two of the input ports may be low-pass input ports, and the others may be high-pass input ports. The port connected with the low-pass filter in the +45° duplex balun feeding line is a low-frequency band signal input terminal, the port connected to the high-pass filter is a high-frequency band signal input terminal, and the connection mode of the two ports of the −45° duplex balun feeding line is the same as that of the +45° polarization.

The highly-integrated high-gain dual-polarized duplex antenna can be used to form a dual-band base station antenna array.

Figure 4:
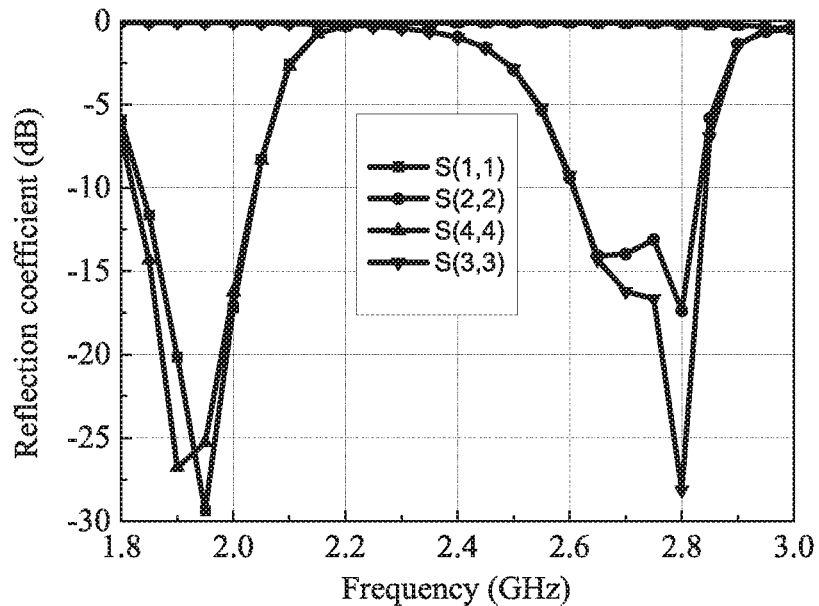
FIG. 4 is a reflection coefficient diagram of four ports of a dual-polarized duplex antenna according to an embodiment of the present disclosure.

Referring to FIG. 4, an embodiment of a high-gain dual-polarized duplex antenna element that is based on a frequency selective balun of the present disclosure has good matching performance and band-pass filtering performance in both working frequency bands.

Figure 5:
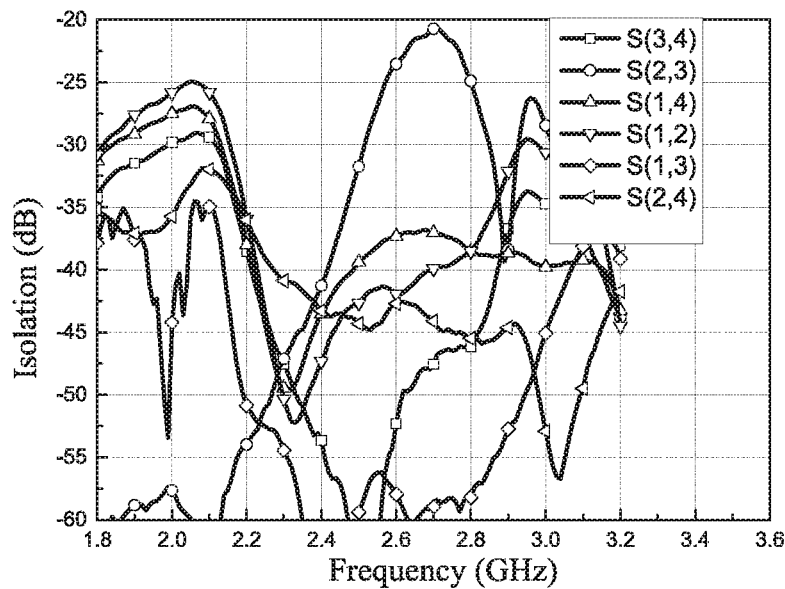
FIG. 5 shows isolation between four ports of a dual-polarized duplex antenna according to an embodiment of the present disclosure.

FIG. 5 illustrates the isolation between ports of a high-gain dual-polarized duplex antenna element based on a frequency selective balun.

Figure 6:
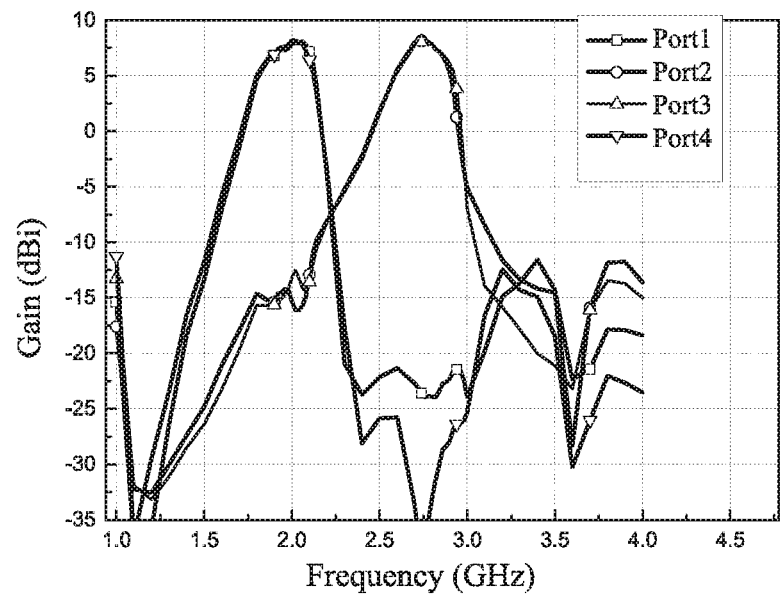
FIG. 6 is a gain plot of a dual-polarized duplex antenna according to an embodiment of the present disclosure.

FIG. 6 illustrates a gain plot of a high-gain dual-polarized duplex antenna element based on a frequency selective balun. According to the result in FIG. 6, it can be seen that the gain of the high-gain dual-polarized duplex antenna element is higher, indicating that the loss is small, and at the same time, when the antenna operates in one of the frequency bands, the antenna has a higher suppression in the other frequency band.

Figures 7A, 7B:
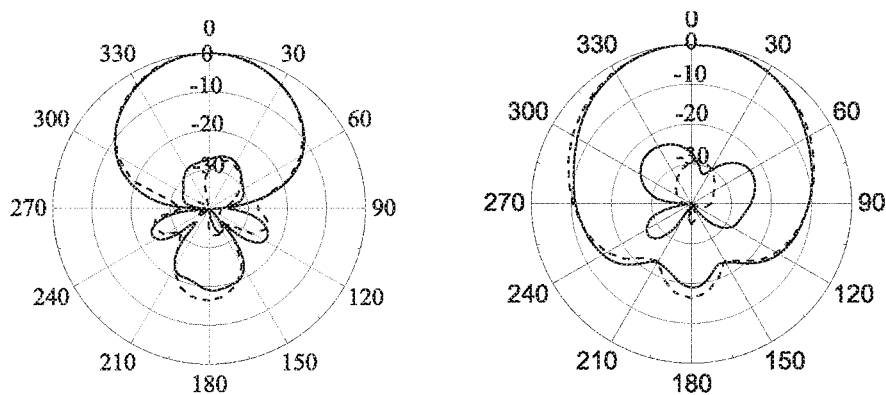
FIG. 7(a) and FIG. 7(b) are E-plane and H-plane radiation patterns, respectively, of the dual-polarized duplex antenna operating at a lower frequency (2 GHz) according to an embodiment of the present disclosure.
Figure 8B:
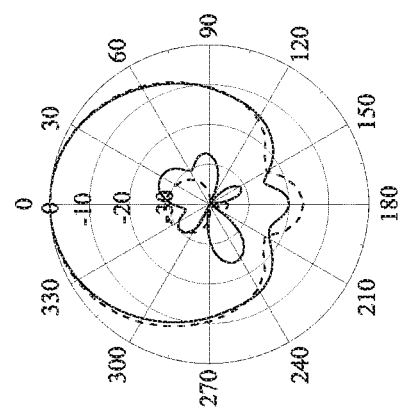
FIG. 8(a) and FIG. 8(b) are E-plane and H-plane radiation patterns, respectively, of the dual-polarized duplex antenna operating at a higher frequency (2.75 GHz) according to an embodiment of the present disclosure.
Figure 8A:
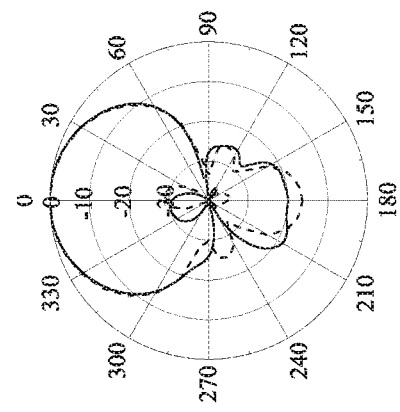

FIGS. 7(*a*)-7(*b*) are radiation patterns of a high-gain dual-polarized duplex antenna element operating at a low frequency of 2 GHz. FIGS. 8(*a*)-8(*b*) are radiation patterns of a high-gain dual-polarized duplex antenna element operating at a high frequency of 2.7 GHz. As can be seen from the result, the radiation pattern of the two frequency bands are very stable, indicating that the filtering performance of non-limiting embodiments or aspects of the present disclosure does not affect the radiation performance in the antenna passband.

In summary, a highly-integrated high-gain dual-polarized duplex antenna unit of the present disclosure is designed to have a good filtering performance and a low cross-polarization ratio for the current application. Due to the integrated design of the antenna and filter, the introduced insertion loss is small, and the radiation performance and radiation efficiency of the antenna are good. The average gain in the passband can reach about 8 dB, and the cross-polarization ratio can reach 18 dB. The polarization isolation between the two ports can reach 25 dB, and the polarization isolation in the same frequency band exceeds 22 dB. It is worth mentioning that a high-gain dual-polarized duplex antenna element that is based on a frequency selective balun of the present disclosure simultaneously achieves duplex (dual-frequency operation) and dual polarization without any additional size, and has good application value.

The foregoing embodiments are preferred implementations of the present disclosure. However, the implementations of the present disclosure are not limited to the foregoing embodiments. Any other changes, modifications, replacements, combinations, and simplifications made without departing from the spirit, essence, and principle of the present disclosure shall all be equivalent replacements, and all fall within the protection scope of the present disclosure.

The invention claimed is:

1. A dual-polarized duplex antenna, comprising:
   a top-layer dielectric substrate;
   a metal reflective ground plate below the top-layer dielectric substrate;
   vertically-placed duplex baluns for duplexing operation between the top-layer dielectric substrate and the metal reflective ground plate,
   wherein each of the vertically-placed duplex baluns comprises a vertical dielectric substrate, a balun feedline printed on a front side of the vertical dielectric substrate, and a ground plane with an etched slot line printed on a reverse side of the vertical dielectric substrate,
   wherein the balun feedline comprises a low-pass filter, a high-pass filter and a microstrip feeding structure,
   wherein the low-pass filter and the high-pass filter are located on two sides of the slot line, and wherein the low-pass filter and the high-pass filter are connected together via the microstrip feeding structure; and
   four dipole arms horizontally printed on an upper surface of the top-layer dielectric substrate, wherein two dipole arms of the four dipole arms are placed at +45°, wherein the other two dipole arms of the four dipole arms are placed at −45°, and wherein the four dipole arms are in symmetry with respect to a center of the top-layer dielectric substrate.

2. The dual-polarized duplex antenna according to claim 1, wherein the vertically-placed duplex baluns include two duplex baluns, wherein the two duplex baluns have a same structure, are in orthogonal nesting arrangement, and are placed in directions of +45° and −45°, respectively, wherein an upper side of the ground plane of a duplex balun placed in the direction of +45° is connected with the two dipole arms at +45°, wherein a bottom of the ground plane of the duplex balun placed in the direction of +45° is connected with the metal reflective ground plate, wherein the ground plane of a duplex balun at −45° is connected with the other two dipole arms at −45°, and wherein a bottom of the ground plane of the duplex balun at −45° is connected with the metal reflective ground plate.

3. The dual-polarized duplex antenna according to claim 2, wherein the low-pass filter is formed through a connection of at least one open-circuited stub with a low-pass main microstrip line in parallel;

wherein the high-pass filter is formed through connection of at least one short-circuited stub with a high-pass main microstrip line in parallel, and wherein the microstrip feeding structure includes a microstrip line and U-shaped microstrip lines which are connected at each end by coupling thereof.

4. The dual-polarized duplex antenna according to claim 3, wherein the at least one open-circuited stub includes four open-circuited stubs, which are located at an upper end, a left side, and a right side of the low-pass main microstrip line, and wherein the at least one short-circuited stub includes four short-circuited stubs, which are connected in parallel at an upper end, a left side, and a right side of the high-pass main microstrip line.

5. The dual-polarized duplex antenna according to claim 3, wherein the high-pass main microstrip line and the low-pass main microstrip line are formed through connection of a plurality of microstrip lines with different widths in series.

6. The dual-polarized duplex antenna according to claim 1, further comprising:

four input ports, wherein two of the four input ports include low-pass input ports, the other two of the four input ports include high-pass input ports, wherein each of the two low-pass input ports is connected with the low-pass filter, and wherein each of the two high-pass input ports is connected with the high-pass filter.

7. The dual-polarized duplex antenna according to claim 1, wherein the metal reflective ground plate is horizontally placed below the top-layer dielectric substrate.

8. A dual-band base station antenna array, comprising:

a plurality of the dual-polarized duplex antennas according to claim 1, wherein the dual-band base-station antenna array is composed of a number N×a number M of the plurality of dual-polarized duplex antennas.

* * * * *

UNITED STATES PATENT AND TRADEMARK OFFICE
CERTIFICATE OF CORRECTION

PATENT NO. : 11,296,425 B2
APPLICATION NO. : 16/491400
DATED : April 5, 2022
INVENTOR(S) : Xiuyin Zhang et al.

Page 1 of 1

It is certified that error appears in the above-identified patent and that said Letters Patent is hereby corrected as shown below:

On the Title Page

Item (73), Column 1, Assignee, after "Technology" insert -- , CN --

Item (57), Column 2, Abstract, Lines 1-8, after "includes" delete "a top-layer dielectric substrate; a metal reflective ground plate below the top-layer dielectric substrate; vertically-placed duplex baluns for duplexing operation between the top-layer dielectric substrate and the metal reflective ground plate; and four dipole arms horizontally printed on an upper surface of the top-layer dielectric substrate. Each of the duplex balun includes"

Signed and Sealed this
Fourteenth Day of June, 2022

Katherine Kelly Vidal
*Director of the United States Patent and Trademark Office*